Figure 1:
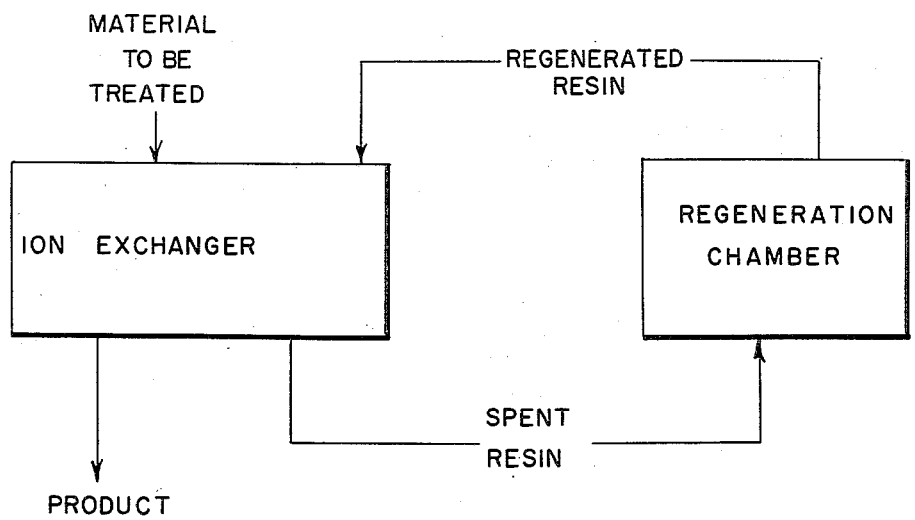

March 4, 1958

R. L. DALTON ET AL 2,825,659

BASIC HYDROUS CHROMIA AND BASIC WERNER
COMPOSITIONS AND PROCESS OF APPLYING
SAME TO GLASS FIBER

Filed May 11, 1953

INVENTORS
RICHARD L. DALTON
FRANK B. HAUSERMAN

BY John E. Griffiths

ATTORNEY

2,825,659

BASIC HYDROUS CHROMIA AND BASIC WERNER COMPOSITIONS AND PROCESS OF APPLYING SAME TO GLASS FIBER

Richard L. Dalton and Frank B. Hauserman, Wilmington, Del., assignors to E. I. du Pont de Nemours & Company, Wilmington, Del., a corporation of Delaware Application May 11, 1953, Serial No. 354,420

20 Claims. (Cl. 117—126)

This invention relates to acido chromic compounds, hydrous chromia, and mixtures of them which have high ratios of chromium atoms to inorganic acid radical and to the use of the mixture or either of them for treatment of fibers such as glass fiber. The invention is further directed to processes for the preparation of the novel Werner complexes and their mixtures with hydrous chromia.

Acido chromic complexes especially useful for the treatment of glass fibers and other fibers which are to be bonded into natural or synthetic resins are shown in Goebel and Iler Patents 2,544,666, 2,544,667 and 2,544,668. These patents also show the use of such chromium complexes in various relations and especially the use in the treatment of glass fibers which are to be bonded to plastics. Steinman's Patents 2,552,910 and 2,611,718 also show the use of Werner complexes for the treatment of glass fibers which are to be bonded into resins.

It is not necessary here to repeat all of the disclosure of these cited patents but it will be understood that the present invention is concerned with, among other things, the modification of compounds described in these patents and their application to such uses as are there shown.

Following the processes described in the cited Goebel and Iler patents it is not practical to exceed a basicity for the Werner complex much in excess of 50%. The present invention provides novel products, and processes for producing them, in which the basicity is greater than 50%.

According to the processes of the present invention an acido chromic complex of the usual low basicity is treated with an anion-exchanger to raise the basicity. The basicity can be raised to any desired figure, though it will be understood that as the basicity approaches a maximum the products will tend to precipitate from solution or suspension. Water soluble complexes having basicities up to 96% may easily be obtained using an anion-exchanger. This is a chromium:acid radical ratio of 8:1.

If stability and water solubility are of no particular importance the basicity may go as high as 99%. This is a chromium:acid radical ratio of 33:1. However, if the products are not to be used immediately and if it is desired that they be stable and entirely water-soluble, the basicity should preferably not be much more than about 96%. Lower basicities can of course be used but the advantages of the invention are primarily obtained when the basicity is at least as high as 70%.

It will be understood that in accordance with preferred embodiments of the invention, hydrous chromia is also used in admixture with the complexes. With such mixtures the basicities will be as set out above. It will, however, be noted hereafter that polyvalent inorganic acid radicals may be used with the hydrous chromia.

While the basicity of the basic chromium compounds is preferably the same as that of the Werner complexes above described and will ordinarily not go below about seventy percent, it will be understood that in the case of the basic chromium salt the basicity may be as low as, say 50%. This is particularly true where the basic chromium chloride is used in combination with a Werner complex.

Reference is had to the cited Goebel et al. and Steinman patents for a full description of the Werner compounds and their modes of use. A brief description will be given of the types of compounds thus referred to and suitable for use according to the present invention.

Any Werner complex may be used in which a trivalent nuclear chromium atom is co-ordinated with a carboxylic acido group having from 2 to 8 carbon atoms.

The chromium complex may be more narrowly of the type consisting of an unsaturated monocarboxylic acido group of 2 to 6 carbon atoms, the acido group being co-ordinated through the carboxyl radical with a trivalent chromium atom.

As has been observed in the Goebel and Iler patents, the Werner complexes may contain any of a very wide variety of acido groups. There may be used, for instance, "p-hydroxybenzoato" groups. There may be used such unsaturated functional acido groups as "acrylato," "crotonato," "sorbato," "isocrotonato," "alpha and beta ethyl acrylato," "angellato," and "tiglato," and "beta furyl acrylato," "cyanacetato" and "chloroacetato."

The groups in the complex other than the functional acido groups with which chromium is co-ordinated is of secondary importance. The groups are preferably either neutral or monovalent. There may be present aqua groups ($H_2O$) and hydroxyl groups. There may be present monovalent inorganic acid radicals such as chloro, bromo, nitrato.

As examples of such chromium complex there are tabulated the following:

p-Aminobenzoato chromic chloride
Benzoato chromic chloride
Crotonato chromic chloride
Cyanoacetato chromic chloride
2,4-dihydroxybenzoato chromic chloride
Furoato chromic chloride
Gallato chromic chloride
Glycinato chromic chloride
Gluconato chromic chloride
Nitrobenzoato chromic chloride
Propionato chromic chloride
Salicylato chromic chloride
Thioglycolato chromic chloride
Trichloroacetato chromic chloride
Trimethylacetato chromic chloride For the Werner complexes the ratio of chromium: acido groups may broadly vary from about 1:1 to 100:1. More specifically it is desired that the ratio vary from about 2:1 to 5:1. These ratios can be adjusted by a selection of reactants in processes such as those shown in the above cited Goebel and Iler patents, or Werner complexes having a fairly low ratio of chromium to acido groups can be given an effectively higher ratio of chromium to acido groups by the addition thereto and combinations therewith of basic chromic chloride as will be discussed hereafter.

The ratio of chromium to acido groups selected will depend in each instance upon the particular use to which the complex is to be put. For example, when the chrome complex is used as a coupling agent between unsaturated resins and glass fibers, a 2:1 ratio of chromium : acido groups appears to be optimum. On the other hand, if the compositions are to be used to insolubilize polymers such as polyvinyl alcohol or polyvinyl acetate then a much higher ratio is desired.

It is to be noted that ordinarily the Werner complexes are used commercially in aqueous solutions which in addition to water contain a lower alcohol such as isopropanol.

According to the invention the Werner complexes can be combined with hydrous chromia, or the latter can be used alone.

Chromium salts such as chromium chloride, chromium nitrate, chromium sulfate, and the like are widely used for such purposes as leather tanning. In such uses the salt is ordinarily partially neutralized to make a basic chromium salt such as basic chromium chloride, basic chromium nitrate, and basic chromium sulfate. The preparation of these highly water soluble basic chromium compounds is well understood, for example, in the leather tanning art. One preferred method for making basic chromium compounds is shown in U. S. patent, Iler, 2,524,803 in which chromic acid is treated with, for example, hydrochloric acid and the chromium chloride produced is reduced to the trivalent state through the use of a lower aliphatic alcohol such as isopropanol.

Basic chromium salts as described may be modified according to processes of the invention by treatment with an anion-exchanger. This raises the basicity, expressed in the same way as for the Werner complexes, and leads to the production of novel compounds which can be used in the novel compositions of the present case. The considerations as to the ratio of chromium to inorganic acid radical, that is basicity, are as set out above in connection with the Werner complexes and the ranges are as there described.

There is this difference, that the basic chromium salts are more stable at extremely high chrome ratios, and ratios as high as 33:1 of chromium to the acid radical are practical, basicity 99%.

According to the processes of the invention a Werner complex, or a basic chromium salt, or a mixture of them is treated with an anion-exchanger. Any of the anion-exchangers known in the art may be used.

Anion-exchangers are generally well known, and the composition of the anion-exchangers and their mode of use are fully described in the literature. Suitable materials are mentioned, for instance, in U. S. Patents 2,438,230 and 2,422,054. A description of both cation- and anion-exchangers will be found in the May 1945 issue of "Chemical Industries" in an article entitled "Ion-exchange" by Sidney Sussman and Albert B. Mindler at pages 789 et seq. A further description of anion-exchangers may be found in Annual Review of Physical Chemistry, vol. 2, 1951, published by Annual Reviews, Inc., in a section by G. E. Boyd, page 313 and following.

It is in general preferred to use anion-exchangers which are rather weakly basic. Thus, while any of anion-exchangers described will be found useful, the insoluble resins obtained by the reaction of formaldehyde with an aromatic amine are particularly valuable for use according to the present invention. Such products are described, for instance, in the U. S. Patent 2,151,883 of Adams and Holmes. Reference is also made, for instance, to the metaphenylenediamine-formaldehyde type of anion-exchanger in the Ryznar Patent 2,438,230. Weakly basic anion-exchangers of the types mentioned are sold commercially under such names as "Amberlite IR-4B" and "Amberlite IR-45."

Stronger anion-exchangers may be used if care is taken to avoid local coagulation because of local concentrations. For example, the resin may be added very slowly with considerable agitation or the reaction may be effected in a counter current manner so that phase boundaries are rapidly interchanged and to avoid local high pH regions which will cause the chromium to precipitate.

Typical of the strong-base type anion-exchangers are those containing quaternary ammonium groups. Such materials are commercially available as "Amberlite IRA-400" and "Nalcite SAR." Similarly a guanidine type anion-exchanger may also be used.

The anion-exchanger, or anion resin, used will first be converted to a basic form, that is the form which has a pH above 7. This is done conventionally by treating the exchanger with sodium hydroxide, sodium carbonate, or another strong alkali.

Anion exchange can be effected by simply adding an anion-exchanger to an aqueous solution of the chrome complex or the chromium salt or mixture thereof which is to be treated. The addition of the exchanger can proceed until the desired ratio of chromium to acid radical is obtained. The solution being treated should be agitated and if the resin is strong the agitation should be comparatively vigorous and the exchanger should be added slowly.

The process can be made continuous by allowing a slow overflow of the ion-exchanged liquid and by continuously adding material to be treated. The resin used can be partly exhausted and this result can be effected, for example, by not entirely regenerating the resin after each operation. This technique is especially advantageous if the resin is a strongly basic one.

The ion exchange can be effected in a column and the exchanger regenerated by backflow of a regenerating solution or the exchange can be effected in a kettle with separation of the exchanger and regeneration in a separate area. The various techniques for effecting ion-exchange can be applied in the processes of the present invention.

As has been suggested above, the chrome complex can be treated with an anion-exchanger in one operation and a basic chromium salt can be treated in another and the resulting solutions can be brought together to make mixtures of the invention. Alternatively, the chrome complex and the basic chromium salt can be brought together prior to treatment with an anion-exchanger.

One embodiment of a continuous ion exchange treatment process according to this invention is illustrated schematically in Figure 1 of the accompanying drawing, wherein conventional apparatus referred to above are represented diagrammatically. As shown in Figure 1, the material to be treated, i. e., the chromium complex, the basic chromium salt, or both the chromium complex and the basic chromium salt together, is introduced into an ion exchanger containing an ion exchange resin which in turn is circulating in a system adapted by conventional procedures to regenerate the spent ion exchange resin and return the regenerated resin to the ion exchanger.

When reference is made to the use of a basic chromium salt it will be understood that these are used primarily because they are comparatively cheap and readily available. However, if desired one may use instead a chromium salt which is not basic. This can be treated with an anion-exchanger and the ratio of chromium to acid radical can be lowered to the figures as above described.

The products obtained according to the processes of the invention are polymerized. The Werner complex is changed from a wholly water soluble material to a colloidal dispersion exhibiting the Tyndall effect. The colloidal nature of the product indicates the polymerization of the Werner complex molecules. Similarly, when the basic chromium salt is treated with an anion-exchanger polymerization occurs. The entirely water-soluble material again is converted to a sol of particles which show a Tyndall effect. The sols of hydrous chromia as thus produced do not settle and the low turbidity indicates that the particle size must be very small.

The polymerized basic chromium salt forms a sol of hydrous chromia. The chloride or other acid radical remaining in an aqueous solution after the anion-exchange serves as a stabilizing radical. By hydrous chromia we mean those compositions which have a basicity above 70%.

The products are quite stable and have been prepared with, for example, up to 10 percent of the Werner complex in aqueous dispersion. Similar concentrations have been prepared of the basic chromium salt. The products are highly reactive and, for example, either the polymerized chrome complex or the polymerized basic chromium salt bond very tightly to glass and other siliceous surfaces. In addition, they are highly effective as insolubilizing agents for hydroxylated polymers such as polyvinyl alcohol and they will greatly improve the wet scrub resistance of these materials. It is further to be observed that the polymerized Werner complexes of this invention can be used in a wide variety of uses such as those shown in the Goebel and Iler patents, and others, and they have the additional advantage in many uses that their lower acidity makes them more acceptable.

They are particularly useful on those substrates such as cellulosic materials which have a tendency to tendering in the presence of acids.

The polymerized Werner complexes, the polymerized basic chromium compounds, or mixtures of them prepared according to processes of the invention may be used for the treatment of glass fibers or fabrics to increase the bond with various natural or synthetic resins. For example, the unsaturated chromium complexes are particularly useful in treating glass fibers to be used in polyester resins, while the parahydroxybenzoato chromic chloride or the 2,4-dihydroxybenzoato chromic chloride are particularly useful with melamine or phenolic type resins. The latter complexes are also particularly useful with the epoxy type resins.

Figure 2:
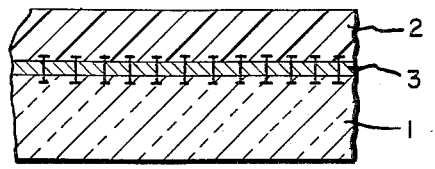

An illustration of an article utilizing the binding property of the compositions of this invention appears in Fig. 2 of the accompanying drawing, wherein reference numeral 1 refers to a material, e. g., glass fiber or fabric this is effectively bonded to another material 2, e. g., a natural or synthetic resin, by means of composition 3 which comprises the polymerized Werner type chromium complexes, the polymerized basic chromium compounds, or mixtures of them, according to this invention. The coupling or bonding action of the composition 3 is illustrated schematically in the drawing.

Polymerized methacrylato chromic chloride either with or without polymerized basic chromic chloride is an especially preferred embodiment of the present invention. This can be used for the treatment of glass fibers or fabrics which are to be used in various polymers such as polyester resins and phenolic resins.

While specific reference has been made to the use of methacrylato chromic chloride and other products of the invention for the treatment of glass fibers it will be understood that they may similarly be used in various of the relations described in the Goebel and Iler patents and of the Steinman patents above cited.

In addition to the examples above generally given, the following are specific illustrative examples:

*Example 1*

The preparation of hydrous chromia was carried out as follows:

A solution of a basic trivalent chromium salt having a basicity of 33⅓% was made by reducing the hexavalent chromium compound, chromic oxide ($CrO_3$), using isopropanol as the reducing agent. Thus, a solution of 33.6 parts by weight of chromic oxide in 66.4 parts of 36% hydrochloric acid was slowly added to a refluxing solution of 5.4 parts of hydrochloric acid in 94.6 parts of isopropanol. Analysis of the resulting solution showed 8.35% chloride and 7.43% chromium. The atomic ratio of chlorine to chromium was adjusted to 2:1 by the addition of 4.92 parts of hydrochloric acid. This solution of basic chromic chloride will be referred to hereafter as solution A.

One part of the basic chromic chloride prepared above as solution A was diluted with 9 parts of water and slurried with 4 parts of the basic form of the anion-exchange resin Amberlite IR–4B, an amminated phenol formaldehyde resin. After stirring for 12 minutes the solution was filtered, and the filtrate contained hydrous chromia having a basicity of 93.3%. The resulting solution was used for treating glass fibers to improve the bond between resins and the glass.

*Example 2*

Methacrylato chromic chloride was prepared from basic chromic chloride by adding 4.97 parts of methacrylic acid and 9.26 parts of isopropanol to 85.76 parts of the basic chromic chloride solution prepared as solution A in Example 1. The isopropanol acted as a solvent in this step of the reaction. The resulting mixture was heated to reflux for 15 minutes and then allowed to cool. The resulting methacrylato chromic chloride contained 6% chromium and was soluble in water and had a chloride to chromium atomic ratio of 2:1. One part of the prepared methacrylato chromic chloride was diluted with 9 parts of water and 4 parts of the basic form of the anion-exchange resin Amberlite IR–4B was added and the mixture stirred for 12 minutes. The slurry was then filtered, and the filtrate contained the active Werner complex in such a form that it readily polymerized. The resulting solution had a basicity of 83.3%.

The active complex between methacrylic acid and the chromium was diluted by adding 4 parts of water to each part of the deionized solution prepared as above described and heat cleaned glass fabric (181 style, finish 112, Owens-Corning-Fiberglas) was immersed in the solution and the wet fabric dried at 150° C. The dried fabric showed a marked affinity for polyester resins and produced laminates having exceptionally high wet strengths. These laminates were very translucent and possessed excellent electrical properties.

*Example 3*

Basic chromic chloride prepared as described in Example 1 was mixed with methacrylato chromic chloride as described in Example 2 in the ratio of 3 parts basic chromic chloride to 2 parts of methacrylato chromic chloride. One part of the mixed materials was diluted with 9 parts of water and 3 parts of the basic form of the anion-exchange resin Amberlite IR–4B was added. The mixture was stirred for 10 minutes and then filtered. The filtrate contained essentially chloride-free chromium compounds and had a bascity of 87%. This solution was used to modify the surface of glass fibers and to render them attractive to laminating resins so that the wet and dry strength of laminates containing glass fibers modified with the above composition were essentially the same.

*Example 4*

Basic chromic chloride was prepared as described in Example 1 having a chlorine to chromium atomic ratio of 2:1. To this solution was added enough 2,4-dihydroxybenzoic acid to give a ratio of chromium atoms to dihydroxybenzoic acid of 2:1. This mixture was heated to reflux for 10 minutes and then allowed to cool. One part of the 2,4-dihydroxybenzoato chromic chloride was diluted with 9 parts of water and 3 parts of the basic form of the anion-exchange resin Amberlite IR–4B added. The slurry was stirred for 10 minutes and then filtered. The filtrate contained the deionized chrome complex having a basicity of 85%. This solution was used to modify the surface of glass fibers so that they were made receptive to phenolic and melamine type resins.

Following the methods of the above examples, other Werner complexes, such as those tabulated in column 2 can be treated with anion-exchangers and used, with or without hydrous chromia, for treating glass fibers, rayon, and other materials to modify their surfaces.

The products above described in the examples and of course in the description, also can be used for the modification of adhesive and film forming compositions such as those containing polyvinyl alcohol or polyvinyl acetate, alkyd resins, and various other natural or synthetic gums and resins. The high basicity Werner complexes, either with or without the basic chromic salt, in addition to the described use with glass fibers and products, can be used for the treatment of fibers, sliver, yarns, or fabrics of nylon, "Orlon" acrylic fiber, "Dacron" polyester fibers, cellulose acetate, and natural fibers such as wool, cotton, ramie, and of course mixtures of the various fibers.

We claim:

1. A water soluble composition comprising a complex of the Werner type in which a trivalent nuclear chromium atom is co-ordinated with a carboxylic acido group of 2 to 8 carbon atoms, and hydrous chromia, the composition having a basicity within the range of 70 to 96%.

2. A water soluble composition comprising a complex compound of the Werner type consisting of an unsaturated monocarboxylic acido group of 2 to 6 carbon atoms, the acido group being co-ordinated through the carbonyl radical wtih a trivalent chromium atom, the ratio of the chromium atoms to the acido groups being from 1:1 to 100:1, and hydrous chromia, the composition having a basicity within the range of 70 to 96%.

3. A water soluble composition comprising methacrylato chromic chloride and basic chromic chloride, the composition having a basicity within the range of 70 to 96%.

4. A water soluble composition comprising a complex of the Werner type in which a trivalent nuclear chromium atom is co-ordinated with a carboxylic acido group of 2 to 8 carbon atoms, the composition having a basicity within the range of 70 to 96%.

5. The water soluble composition comprising a complex compound of the Werner type consisting of an unsaturated monocarboxylic acido group of 2 to 6 carbon atoms, the acido group being co-ordinated through the carbonyl radical with a trivalent chromium atom, the ratio of the chromium atoms to the acido groups being from 1:1 to 100:1, the composition having a basicity within the range of 70 to 96%.

6. A water soluble composition comprising methacrylato chromic chloride having a basicity within the range of 70 to 96%.

7. A water soluble composition comprising hydrous chromia having a basicity within the range of 70 to 96%.

8. A water soluble composition comprising basic chromic chloride having a basicity within the range of 70 to 96%.

9. In a process for the treatment of glass fibers the step comprising treating glass fibers with the composition of claim 1.

10. In a process for the treatment of glass fibers the step comprising treating glass fibers with the composition of claim 6.

11. In a process for the finishing of glass fabric the step comprising immersing the fabric in an aqueous solution of the composition of claim 6 and subsequently drying the fabric.

12. In a process for the modification of a complex of the Werner type in which a trivalent nuclear chromium atom is co-ordinated with a carboxylic acido group of from 2 to 8 carbon atoms and which contains an inorganic acid radical, the step comprising contacting an aqueous solution of the Werner complex with the basic form of an anion-exchanger to lower the content of the inorganic acid radical to produce a water soluble complex of the Werner type having a basicity within the range of 70 to 96%.

13. In a process for the modification of a basic chromic chloride the step comprising treating the basic chromic chloride in an aqueous system with the basic form of an anion-exchanger to produce a water soluble hydrous chromia with a basicity within the range of 70 to 96%.

14. A colloidal dispersion comprising a complex of the Werner type in which a trivalent nuclear chromium atom is co-ordinated with a carboxylic acido group of 2 to 8 carbon atoms, and hydrous chromia, the dispersion having a basicity within the range of 70 to 96%.

15. A colloidal dispersion comprising a complex of the Werner type in which a trivalent nuclear chromium atom is co-ordinated with a carboxylic acido group of 2 to 8 carbon atoms, the dispersion having a basicity within the range of 70 to 96%.

16. In a process for the treatment of glass fibers, the step comprising treating glass fibers with the colloidal dispersion of claim 15.

17. A colloidal dispersion comprising hydrous chromia having a basicity within the range of 70 to 96%.

18. In a process for the treatment of glass fibers, the step comprising treating glass fibers with the colloidal dispersion of claim 17.

19. In a process for the modification of a complex of the Werner type in which a trivalent nuclear chromium atom is co-ordinated with a carboxylic acido group of from 2 to 8 carbon atoms and which contains an inorganic acid radical, the step comprising contacting the Werner complex in an aqueous system with the basic form of an anion-exchanger to produce a colloidal dispersion of the Werner complex having a basicity within the range of 70 to 96%.

20. In a process for the modification of a basic chromic chloride, the step comprising treating the basic chromic chloride in an aqueous system with the basic form of an anion-exchanger to produce a colloidal dispersion of a hydrous chromia having a basicity within the range of 70 to 96%.

References Cited in the file of this patent

UNITED STATES PATENTS

| | | |
|---|---|---|
| 2,273,040 | Iler | Feb. 17, 1942 |
| 2,356,161 | Iler | Aug. 22, 1944 |
| 2,381,752 | Iler | Aug. 7, 1945 |
| 2,418,528 | Robinson et al. | Apr. 8, 1947 |
| 2,470,378 | Skala | May 17, 1949 |
| 2,524,803 | Iler | Oct. 10, 1950 |
| 2,544,666 | Goebel et al. | Mar. 13, 1951 |
| 2,544,668 | Goebel et al. | Mar. 13, 1951 |